United States Patent [19]

Abo et al.

[11] Patent Number: 5,153,834
[45] Date of Patent: Oct. 6, 1992

[54] METHOD AND APPARATUS FOR DETECTING A MISFIRE IN A COMBUSTION CHAMBER OF AN INTERNAL COMBUSTION ENGINE

[75] Inventors: Toshimi Abo, Yokohama; Tatsuo Morita; Nobutaka Takahashi, both of Yokosuka, all of Japan

[73] Assignee: Nissan Motor Co., Ltd., Yokohama, Japan

[21] Appl. No.: 831,633

[22] Filed: Feb. 10, 1992

Related U.S. Application Data

[63] Continuation of Ser. No. 442,420, Nov. 24, 1989, abandoned, which is a continuation of Ser. No. 94,761, Sep. 10, 1987, abandoned.

[30] Foreign Application Priority Data

Sep. 10, 1986 [JP] Japan .................. 61-214587
Sep. 18, 1986 [JP] Japan .............. 61-141788[U]

[51] Int. Cl.$^5$ .................................. F02P 5/15
[52] U.S. Cl. .................. 364/431.08; 123/425; 123/435; 73/116
[58] Field of Search ........... 364/431.04, 431.05, 364/431.08; 123/425, 435; 73/116

[56] References Cited

U.S. PATENT DOCUMENTS

| | | | |
|---|---|---|---|
| 4,216,750 | 8/1980 | Kobayashi | 123/435 |
| 4,483,183 | 11/1984 | Suzuki et al. | 73/116 |
| 4,525,781 | 6/1985 | Konomi et al. | 364/558 |
| 4,531,399 | 7/1985 | Aono | 73/4 R |
| 4,538,454 | 9/1985 | Aono | 73/115 |
| 4,556,030 | 12/1985 | Aono | 123/425 |
| 4,583,507 | 4/1986 | Greeves et al. | 73/116 |
| 4,617,895 | 10/1986 | Sakakibara et al. | 123/425 |
| 4,621,603 | 11/1986 | Matekunas | 123/425 |
| 4,622,939 | 11/1986 | Matekunas | 123/425 |
| 4,624,229 | 11/1986 | Matekunas | 123/425 |
| 4,711,212 | 12/1987 | Haraguchi et al. | 123/425 |
| 4,727,842 | 3/1988 | Takahashi | 123/425 |

FOREIGN PATENT DOCUMENTS

| | | | |
|---|---|---|---|
| 48-16031 | 1/1973 | Japan . | |
| 0044934 | 3/1980 | Japan | 73/117.3 |
| 0018267 | 1/1984 | Japan | 123/425 |
| 59-39974 | 3/1984 | Japan . | |
| 62-26345 | 2/1987 | Japan . | |

Primary Examiner—Parshotam S. Lall
Assistant Examiner—V. N. Trans
Attorney, Agent, or Firm—Foley & Lardner

[57] ABSTRACT

In order to determine the characteristics of combustion which takes place in the combustion chamber of an internal combustion engine, the pressure in the chamber is sampled at predetermined intervals over a predetermined sampling range, the values are mathematically processed in a manner to obtain the position of center of gravity for the instant combustion and the COG position is then compared with pre-recorded data to determine the actual nature of the combustion. Embodiments of the invention improve on the COG position derivation by screening the data with respect to the highest of the sampled values or modifying all of the data with respect to the lowest of the sampled values.

12 Claims, 8 Drawing Sheets

METHOD AND APPARATUS FOR DETECTING A MISFIRE IN A COMBUSTION CHAMBER OF AN INTERNAL COMBUSTION ENGINE

This application is a continuation of application Ser. No. 07/442,420, filed Nov. 24, 1989, now abandoned which is a continuation of application Ser. No. 07/094,761, filed Sep. 10, 1987 now abandoned.

BACKGROUND OF THE INVENTION

1. Field of the Invention

The present invention relates generally to internal combustion engines and more specifically to a system for monitoring the combustion process which occurs in the combustion chamber or chambers of same and for providing data in close to real time, which can be used to indicate improper ignition timing, misfire and the like and which therefore facilitates improved ignition and/or air-fuel control.

2. Description of the Prior Art

Numerous engine control systems have strived to detect engine vibration (knock) and to adjust the timing of the ignition to the threshold of engine knocking. However, under given circumstances this technique does not lead to the actual MBT timing and thus has tended to lack effective control under all circumstances.

U.S. Pat. No. 4,216,750 issued on Aug. 12, 1980 in the name of Kobayashi discloses an engine control system wherein the combustion pressure and the crank angle are detected and the presence of an engine misfire determined when the maximum combustion pressure occurs essentially at or close to TDC and the presence of proper combustion when the maximum pressure develops later in the expansion stroke. However, this system while being equipped with a pressure sensor via which the maximum combustion pressure necessary for MTB control can be detected, has been incapable of detecting a misfire when the engine is idling.

SUMMARY OF THE INVENTION

It is an object of the present invention to provide a system which can assuredly discern the combustion process with sufficient accuracy as to distinguish between misfire, idling and/or the like with the minimum of data and system complexity.

In brief, in order to achieve the above object the pressure in the combustion chamber under examination is sampled at predetermined intervals over a predetermined sampling range, the values are mathematically processed in such a manner to obtain the position of what shall be referred to as a "center of gravity" (COG) for the instant combustion is the COG position and compared with pre-recorded data to determine the actual nature of the combustion. Embodiments of the invention improve on the COG position derivation by screening the data with respect to the highest of the sampled values or modifying all of the data with respect to the lowest of the sampled values.

More specifically, a first aspect of the present invention is in the form of a method of determining the combustion characteristics which occur in a combustion chamber of an internal combustion engine, the method featuring the steps of: sampling the pressure in the combustion chamber at predetermined intervals; using the data derived in the sensing step to determine the position of the center of gravity of the combustion; and comparing the position of the center of gravity with a predetermined value in order to determine the combustion characteristics.

A second aspect of the present invention is in the form of an engine control system for an internal combustion engine having a combustion chamber, which system features: a unit for sampling the pressure in the combustion chamber at predetermined intervals; and a computation unit for: (a) using the data derived by the pressure sampling unit to determine the position of the center of gravity of the combustion; and (b) comparing the position of the center of gravity with a predetermined value in order to determine the combustion characteristics.

DETAILED DESCRIPTION OF THE PREFERRED EMBODIMENTS

Figure 1:
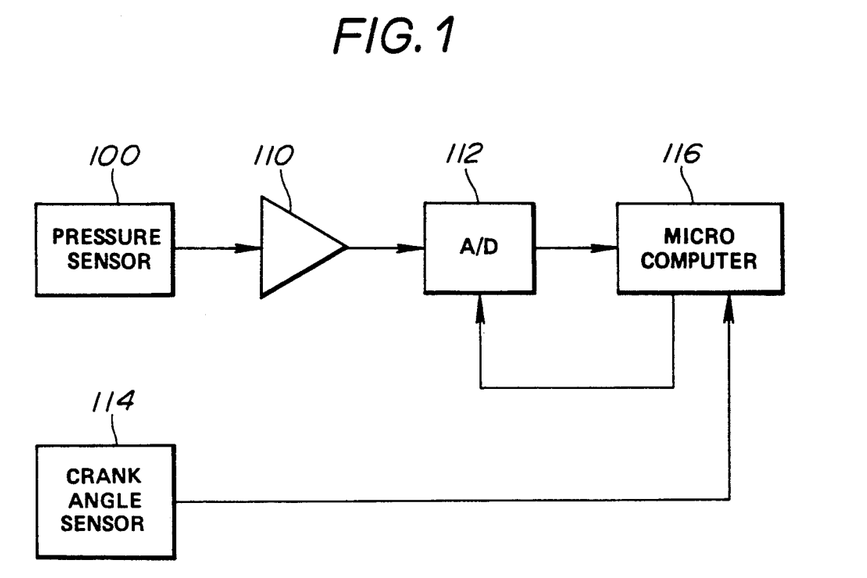
FIG. 1 is a block diagram showing the basic hardware arrangement used in connection with the embodiments of the present invention.

FIG. 1 shows in schematic form the basic hardware layout used in connection with the embodiments of the present invention. This arrangement includes a pressure sensor 100, an amplifier 110 which receives the signal produced by the sensor element 100 amplifies the same and feeds it to a high speed A/D converter 112 of the nature disclosed in Japanese Patent Application provisional Publication 59-39974. The output of the A/D converter is selectively fed to a microprocessor 116 under control of the latter. A crank angle sensor 114 supplies an input to the microprocessor.

Figure 2:
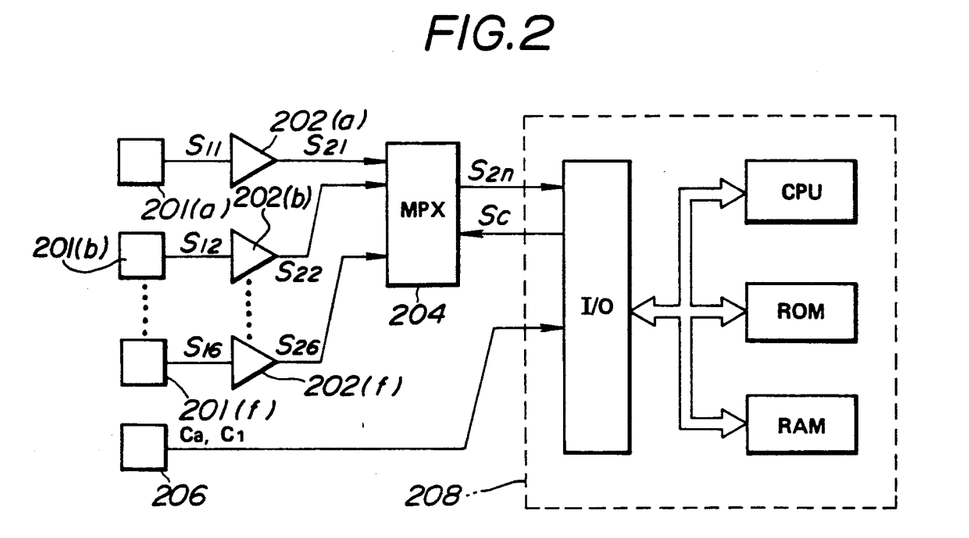
FIG. 2 shows in schematic form a hardware arrangement which can be used in connection with the muticylinder engine for executing the various embodiments of the present invention.

FIG. 2 shows a hardware arrangement which can be used in connection with a multicylinder engine which in this instance (merely by way of example) takes the form of a six cylinder four cycle engine.

In this case six pressure sensors 201(a)–(f) are operatively connected to a muliplexer 204 via amplifiers 202 (a) to (f). The outputs of the sensors S11 to S16 are modified by the amplifiers to take the form of signals S21 to S26. The multiplexer 204 sequentially applies each of the signals S2n to an input/output interface of the microcomputer under the control of a signal Sc which is applied to the MPX 204 from the I/O. Although not shown for the sake of simplicity, it will be understood that it is possible to include an A/D converter in the microprocessor per se. In the event that an A/D converter is not included in the microprocessor chip itself, it is alternatively possible to provide a plurality of high speed A/D circuits of the type mentioned above which are interposed between the amplifers and the multiplexer and arranged to be responsive to either an output issued directly from the I/O or alternatively a control signal generated by the MPX 204.

Figure 3:
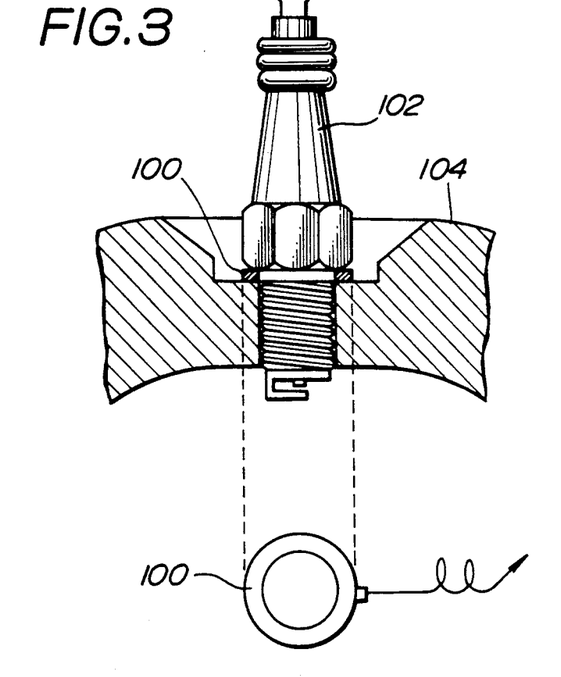
FIG. 3 shows a strain gauge disposed between the engine cylinder head and a spark plug in a manner wherein the output thereof is indicative of the pressure in the combustion chamber associated with the spark plug.
Figure 4:
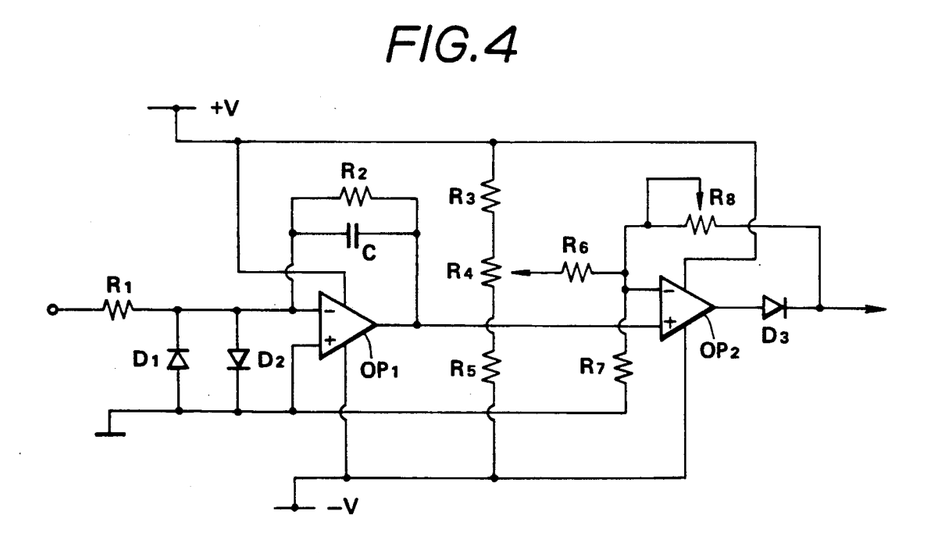
FIG. 4 is a circuit diagram showing an amplifier arrangement which can be used to amplify the output of the strain gauge in a manner which modifies the signal produced thereby into a form suitable for application to either the input interface of a microcomputer, which forms a vital part of the hardware arrangement associated with the embodiments of the present invention, or a high speed A/D converter which is operatively interposed between the sensor arrangement and the control circuit.

FIG. 3 shows an arrangement which enables the pressure prevailing in the combustion chamber to be suitably measured. In this instance the pressure sensor 100 takes the form of an annular piezo element which is secured against the surface of the cylinder head 104 by a spark plug 102. With this arrangement the minute changes which occur in the environment in which the piezo element is sandwiched change with the change in pressure in the combustion chamber (no numeral), the properties of the element change in a manner such that when it is operatively connected with an amplifier of the nature shown in FIG. 4 it is possible to generate a signal suitable for use in the arrangements shown in FIGS. 1 and 2.

Of course it is not outside the scope of the present invention to use devices and hardware arrangements other than those illustrated and disclosed hereinabove if so desired.

Figure 5:
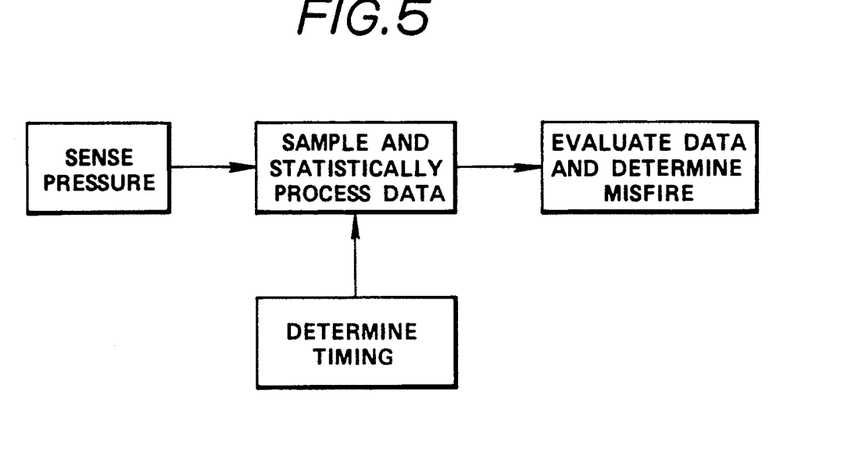
FIG. 5 shows in functional block diagram form the steps which characterize a first embodiment of the present invention.

FIG. 5 shows in functional block diagram form the procedure which characterizes a first embodiment of the present invention. To better understand the concept on which the first embodiment is based reference will now be made to FIGS. 6 to 8.

Figure 6:
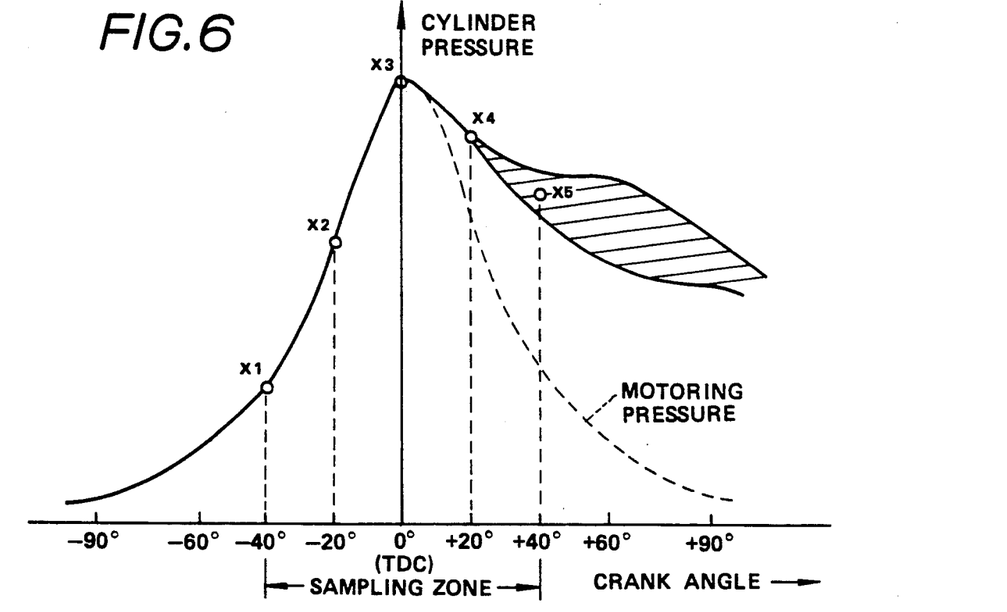
FIG. 6 is a graph showing in terms of cylinder pressure and crank angle, a typical pressure wave form which depicts the pressure developed in the combustion chamber when the engine is idling, and the sampling zone over which pressure readings are taken in accordance with a first embodiment of the present invention.

FIG. 6 shows in graphical form a typical pressure wave form which depicts the pressure development or history which occurs in a combustion chamber during idling of an engine. As is typical under such circumstances, the maximum pressure occurs at TDC. In this figure the broken line curve which is shown after TDC denotes the motoring or pumping pressure. The hatched section denotes the zone in which the pressure wave tends to fluctuate from cycle to cycle.

In accordance with the first embodiment, the pressure prevailing in the combustion chamber is sampled five times. Viz., at $-40°$, $-20°$, $0°$ (TDC), $+20°$, $+40°$. For the sake of value of the last reading is shown as taken in the middle of the hatched range.

Figure 7:
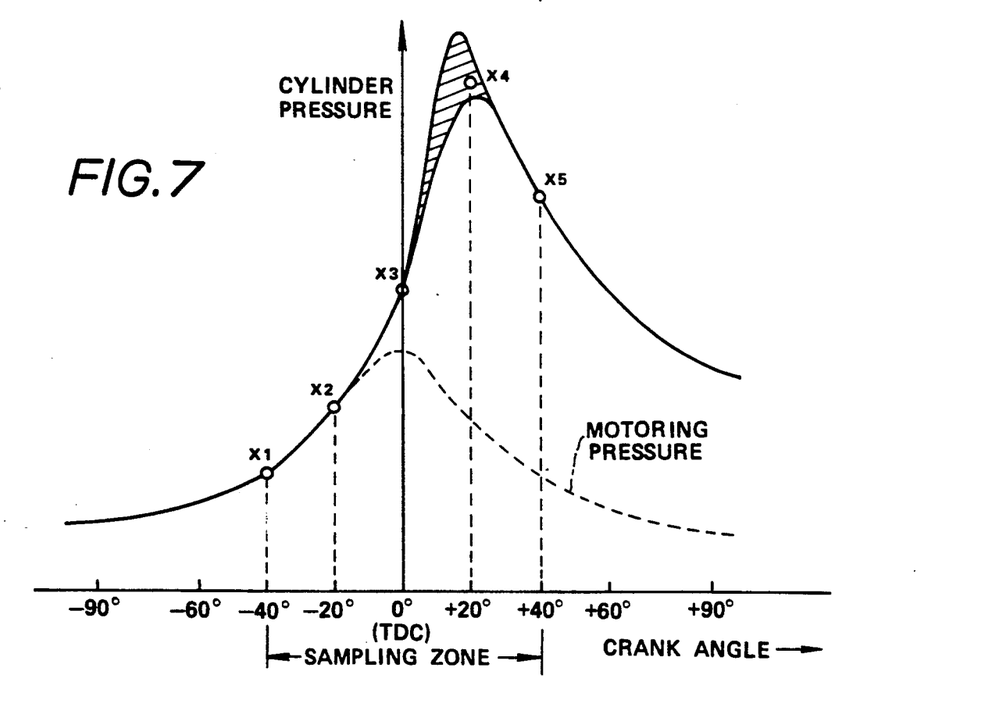
FIG. 7 is a graph similar to that shown in FIG. 6 which shows in terms of cylinder pressure and crank angle, a typical pressure wave form which depicts the presure developed in the combustion chamber when the engine is operating under steady state non-transient modes.

FIG. 7 shows in graphical form a typical pressure wave form which depicts the pressure development history which occurs in a combustion chamber when the engine is operating under steady state or non-transitory conditions and with a given load on the engine. In this figure the hatched section denotes the region in which cycle to cycle fluctuation mainly tends to occur. For the sake of example the forth reading is shown taken as an average of the values which tend to occur at that crank angle.

Figure 8:
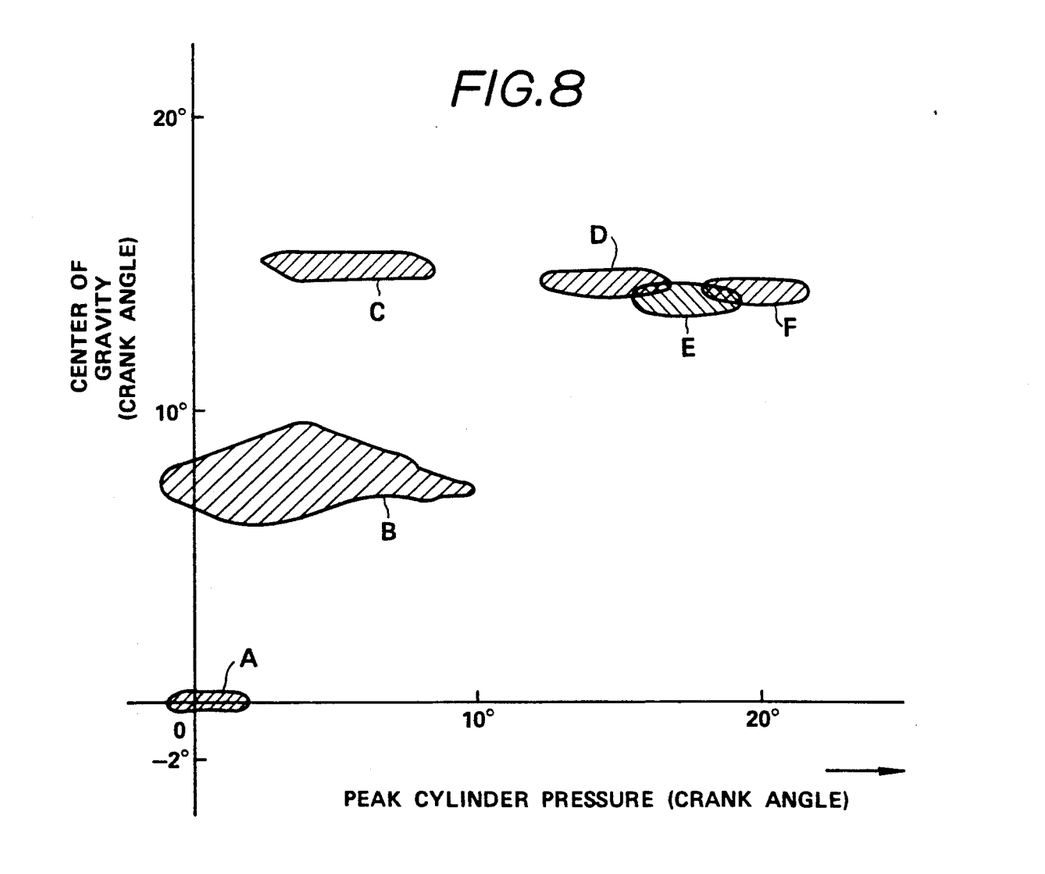
FIG. 8 is a chart showing in terms of the position of the center of gravity and the position of the peak cylinder pressure, the zones which typify the various modes of engine operation.

It has been discovered that even though the amount of data is relatively small per cycle, by calculating the position of the center of gravity (COG) (viz., the crank angle at which the cumulative effect of the sampled pressures can be deemed to have acted) using equation (1) set forth hereinbelow of the pressure development characteristics it is possible to very clearly distinguish between given modes of engine operation. For example, as shown in FIG. 8 the zone A in which the COG fall when the engine is misfiring is clearly separated from the zone B in which the COG values fall when the engine is idling properly and from zones C to F which denote various other engine speed/load zones which tend to be encountered.

Thus, with the first embodiment if the five values are sampled and the results processed according to the following equation:

$$G = \frac{x_1\phi_1 + x_2\phi_2 \ldots + x_n\phi_n}{x_1 + x_2 \ldots + x_n}$$

$$G = \frac{x_1(-40) + x_2(-20) + x_3(0) + x_4(+20) + x_5(+40)}{x_1 + x_2 + x_3 + x_4 + x_5}$$

it is very simple to range the results against the zone arrangement shown in FIG. 8 and determine under what conditions combustion is actually occurring.

Figure 9:
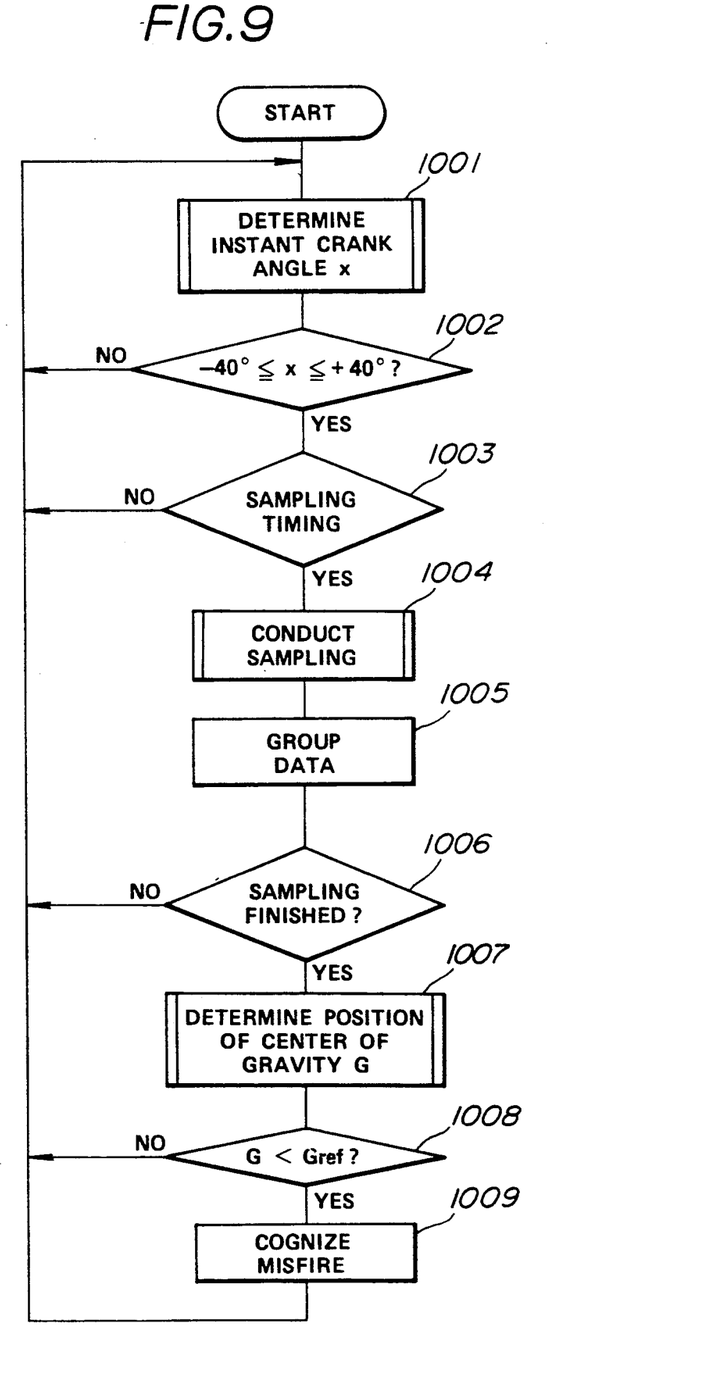
FIG. 9 is a flow chart showing the steps which characterize a control routine which implements the first embodiment of the present invention.

FIG. 9 shows in flow chart form the steps which characterize a routine designed to execute the above described concept. This program is set in the ROM of the microprocessor and is arranged to be run continously during engine operation.

The first step 1001 of the routine is such as read the output of the crank angle sensor and the value set in RAM. At step 1002 the just recorded value is ranged to determine if the sampling range has been reached or not. If answer to the this inquiry is NO, the the program recycles. However, if the instant value is found to be in the sampling range then at step 1003 it is determined if the instant crank angle corresponds to one at which a pressure reading should be taken. In the event the instant crank angle corresponds to one of the five angles at which a reading is to be taken then at step 1004 a command to A/D convert the pressure signal is issued. This step may include further sub-routines which suitably control the operation of the multiplexer 204 in the event that the instant embodiment is applied to all of the cylinders of a multi-cylinder engine.

At step 1005 the data obtained in step 1004 is sorted into order. For example in the case of a six cylinder engine the readings are grouped according to the appropriate cylinder or the like. At step 1006 it is determined if the five samples have been taken or not. This can be done by determining that the required number of samples have been recorded and/or the instant crank angle is outside of the sampling range.

If all the data that is required has been collected and sorted in the desired order, the COG (G) for the instant cycle is calculated using equation (1) in step 1007. At step 1008 the value of G is compared with a reference value Gref. In the event that the instant value of G is less than Gref a command indicating that the instant cylinder is misfiring is issued in step 1009.

As an alternative to the simple detection of misfire for the instant cylinder, it is possible by multiple ranging against a plurality of predetermined COG values to determine whether the instant G value falls within one of zone A, zone B and zones C–F. By including the step of determining the peak pressure value of the five samples taken it is further possible to increase the resolution with which the instant combustion can be classified with respect to zones C to F.

SECOND EMBODIMENT

Figure 10:
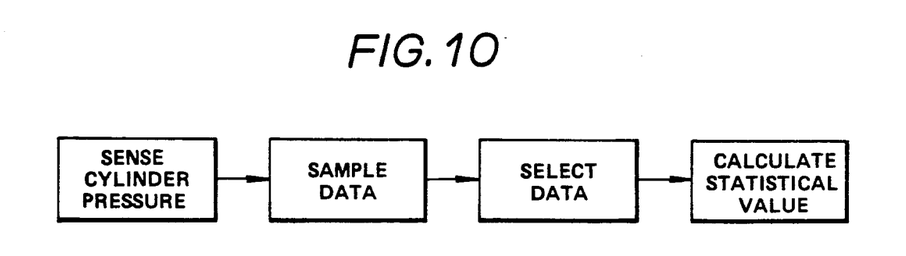
FIG. 10 is a functional block diagram showing the steps which characterize the operation of a second embodiment of the present invention.

FIG. 10 shows in functional block form the characterizing steps which are executed in accordance with a second embodiment of the present invention. The second embodiment features the arrangement wherein the sampled data is selected on the basis of the highest sampled values. The reason for this screening will become more appreciated as a fully discussion of the pressure waves shown in FIG. 11 proceeds.

Figure 11:
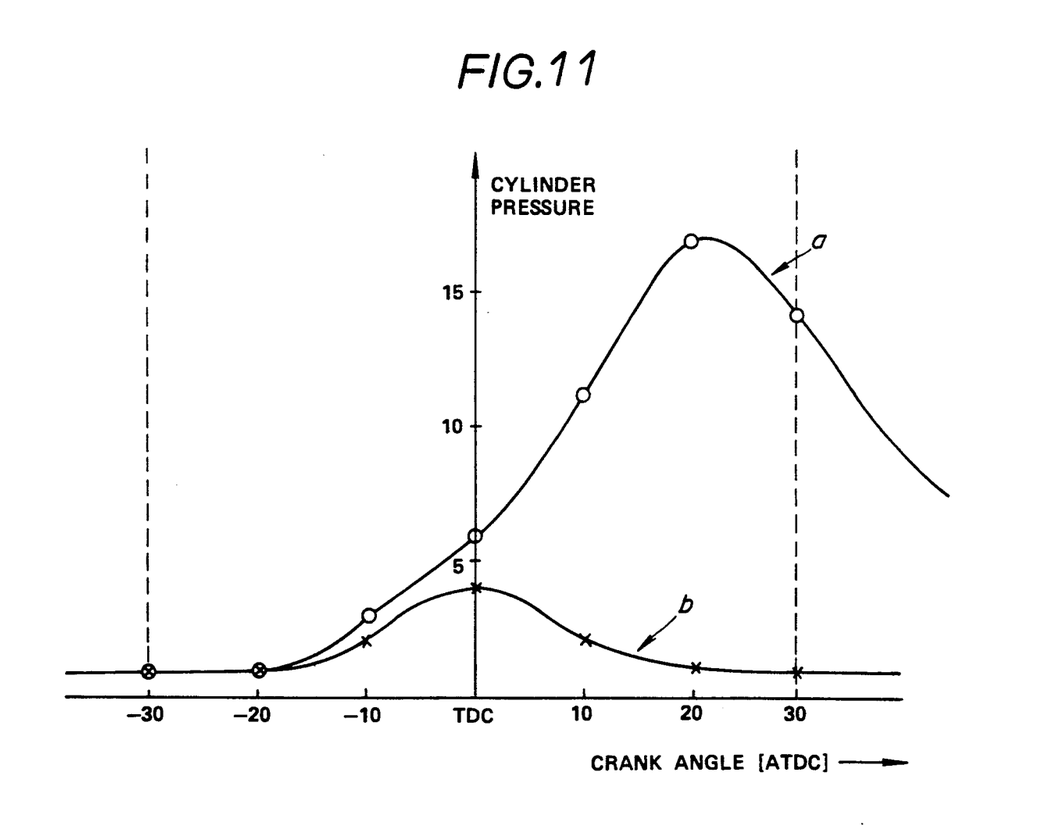
FIG. 11 is a graph which shows, in terms of cylinder pressure and crank angle, two pressure waves, one (a) which is developed during steady state non-transient engine operation and the other (b) which is developed during idling.

FIG. 11 shows a pressure wave (a) which typifies the pressure development or history which occurs when the engine is operating under non-transitory conditions at a given load; and a second wave (b) which typifies the history which occurs when the engine is idling.

As will be apparent from this figure the COG of wave (a) is approximately 20° ATDC. However, if the value of G is calculated using 7 samples taken at $-30°$, $-20°$, $-10°$, TDC, $+10°$, $+20°$ and $+30°$ as follows:

$$G = [(-30) \times 1 + (-20) \times 1 + (-10) \times 3 + 0 \times 6 + 10 \times 11 + 20 \times 17 + 30 \times 14]/(1 + 1 + 3 + 6 + 11 + 17 + 14) = 14.9°$$

It becomes apparent that the calcuated value (14.9°) and the actual value (approx. 20°) deviate rather notably.

In the case of wave (b) the corresponding calculation is as follows:

$$G = [(-30) \times 1 + (-20) \times 1 + (-10) \times 2 + 0 \times 4 + 10 \times$$

-continued
$$2 + 20 \times 1 + 30 \times 1]/(1 + 1 + 2 + 4 + 2 + 1 + 1 + 1) = 0°$$

This is in good correlation with the actual value.

In accordance with a second embodiment of the present invention, in order to avoid erroneous anaylsis of the combustion which is occuring, a technique wherein the peak pressure reading is taken as the center of the sampling range is utilized. While this reduces the amount of data available for calculation it effectively tends to screen out that data which will tend to pull the derived value away from the actual one. For example in the case of wave (a) of the values sampled the value at 20° is the highest. By setting this as the center of the sampling range the situtation is obtained wherein only the values sampled at $+10°$, $+20°$ and $+30°$ are within an acceptable value envelope. However, by using these values the following result is obtained:

$$G = [10 \times 11 + 20 \times 17 + 30 \times 14]/(11 + 17 + 14)$$
$$= 20.7°$$

Using the same technique in connection with wave (b) we obtain:

$$G = [(-10) \times 2 + 0 \times 4 + 10 \times 2]/(2 + 4 + 2) = 0°$$

As will be appreciated, even though the amount of data used for the respective calcuations is reduced, the second embodiment of the present invention provides improved accuracy.

Figure 12:
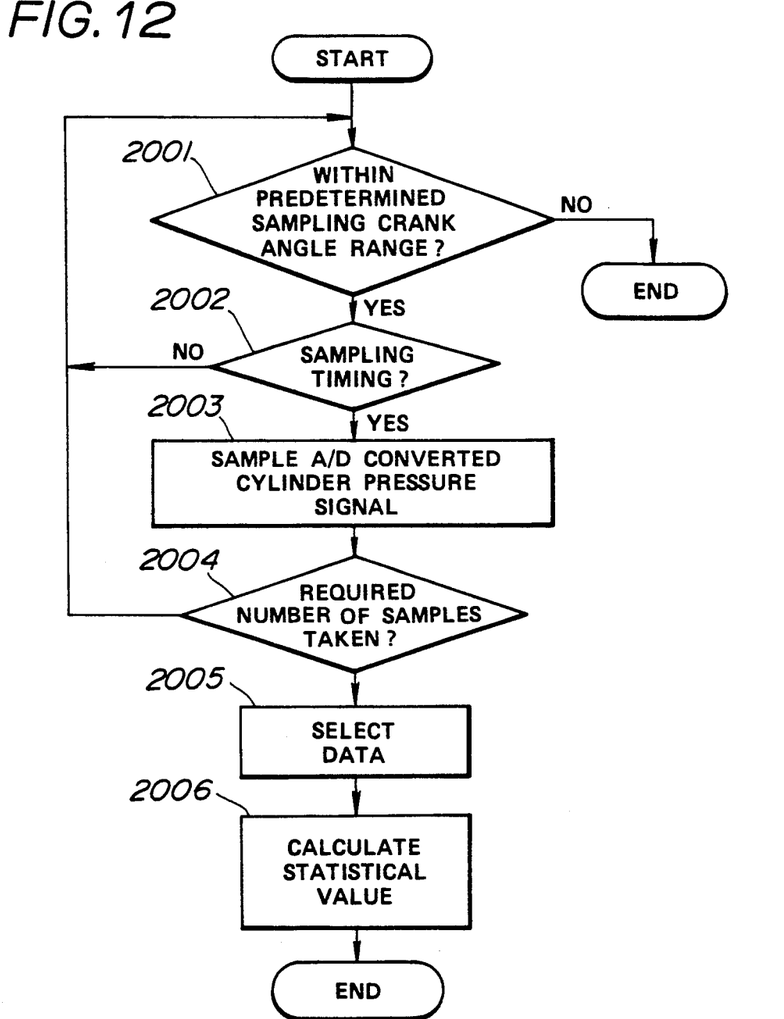
FIG. 12 is flow chart depicting the characterizing steps which are executed in connection with a second embodiment of the present invention.

FIG. 12 shows in flow chart form the steps executed by a routine adapted to execute the second embodiment. This routine differs basically from that shown in FIG. 9 in that in step 2005 of the process the selection of the peak pressure value is made and the unnecessary data is screened out in accordance with the above discussion.

THIRD EMBODIMENT

Figure 13:
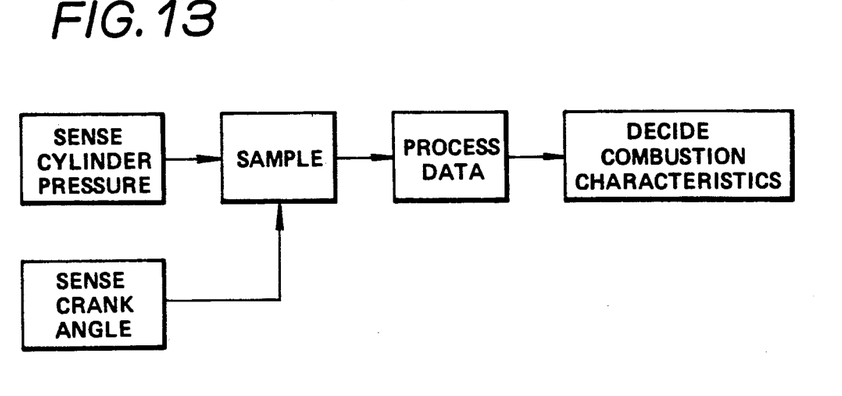
FIG. 13 is a functional block diagram which which depicts the operations which are implemented in connection with a third emodiment of the present invention.

FIG. 13 shows in functional block diagram form the steps which characterize the operation of a third embodiment of the present invention. This embodiment is based on the concept of sampling a predetermined number of pressure values, finding the smallest of the same and arbitarily setting this minimum value to zero and reducing the other values by the amount of the minimum one. In other words, with the third embodiment, the lowest value is used to define a kind of slice level and the values of all the readings taken are rectified in a manner to have values equal to the amount that they are greater than the slice level.

Figure 14:
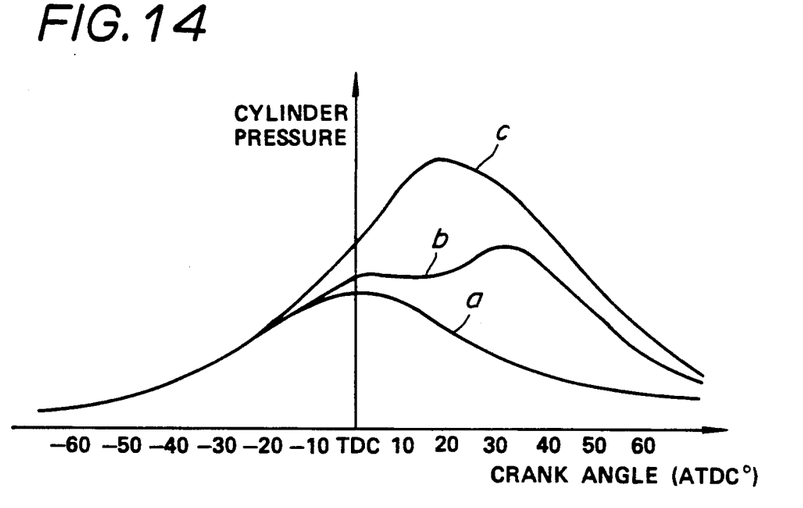
FIGS. 14 to 16 are graphs showing various pressure waves which are used in connection with the discussion of the technique which characterizes the third embodiment of the present invention.
Figure 15:
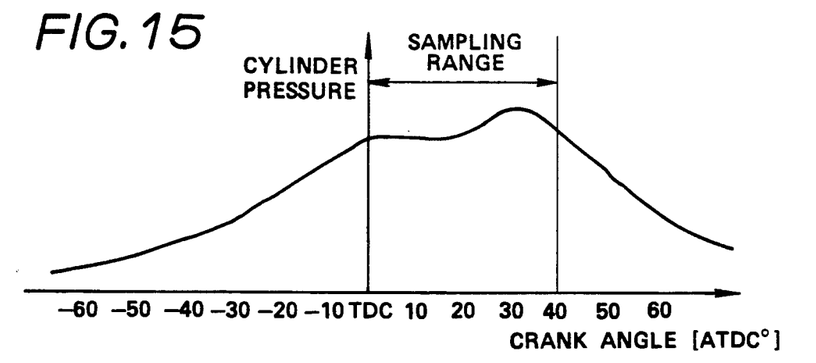
Figure 16:
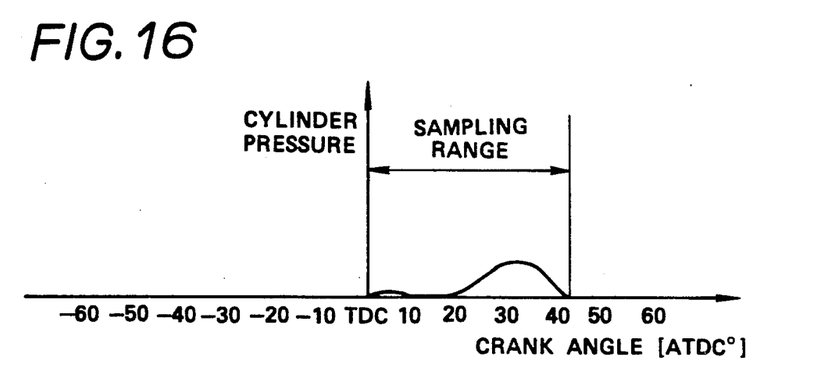

This technique will become more fully appreciated as a discussion of the same is made with reference to FIGS. 14 to 16.

FIG. 14 shows three pressure waves. The first wave (a) denotes the motoring or pumping pressure which occurs in the absence of ignition (e.g. such as during fuel cut-off or the like); (b) denotes a wave such as occurs when the engine tends to misfire; and (c) denotes a wave which is produced by normal combustion.

Table 1 set forth hereinunder compares in terms of crank angle five pressure readings which are taken at TDC, $+10°$, $+20°$, $+30°$ and $+40°$ respectively. Table 2 lists the center of gravity positions which are obtained using the values as they are and without any modification.

TABLE 1

| WAVE | CRANK ANGLE | | | | |
|---|---|---|---|---|---|
| | TDC | +10 | +20 | +30 | +40 |
| a | 30 | 28 | 22 | 16 | 12 |
| b | 33 | 33 | 34 | 40 | 35 |
| c | 41 | 53 | 58 | 53 | 43 |

TABLE 2

| WAVE | COG |
|---|---|
| a | 15.6 |
| b | 20.6 |
| c | 20.1 |

However, as will be readily seen from FIG. 14 the COG of wave (a) occurs relatively soon after TDC, while those of waves (b) and (c) tend to be 30° and 20° respectively. Accordingly, there is a clear discrepency between the actual and the calculated values.

By applying the third embodiment, the situation shown in Tables 3 and 4 is induced. Viz., of the five values sampled for wave (a), the lowest occurs at 40°—viz, a value of 12. The lowest values for waves (b) and (c) are 33 and 41 respectively. By subtracting these values from all of those recorded the situation shown in just mentioned Tables 3 and 4 is derived.

By way of specific example FIGS. 15 and 16 show wave (b) before and after treatment with the technique of the third embodiment. As shown, the slice level is raised to that of the lowest of the recorded values.

TABLE 3

| WAVE | CRANK ANGLE | | | | |
|---|---|---|---|---|---|
| | TDC | +10 | +20 | +30 | +40 |
| a | 18 | 16 | 10 | 4 | 0 |
| b | 0 | 0 | 1 | 7 | 12 |
| c | 0 | 2 | 17 | 12 | 2 |

TABLE 4

| WAVE | COG |
|---|---|
| a | 10.0 |
| b | 31.0 |
| c | 20.9 |

As will be observed these results much more closely approach the actual values. With this increased accuracy it is possible to improve engine control. For example, by determining the position of the combustion COG and ranging this value against ranges such as shown in Table 5, appropriate ignition timing correction can be readily implemented. If the COG does not fall in the ATDC15° to −ADTC25° range the timing may be incrementally advanced or retarded until such a condition is achieved.

Further, in the case that engine is frequently misfiring due to operation on a super lean air-fuel mixture for example, it is possible to slightly enrich the same to the point whereat the misfire ceases. Alternatively, if this measure proves ineffective it may be deemed that a mechanical problem such as a fouled spark plug or a malfuction in the ignition system has occured.

For further disclosure relating generally to the above type of technique and related matters such as calibrating the pressure sensor 100, reference may be had to U.S. Pat. No. 4,531,399 issued on Jul. 30, 1985, U.S. Pat. No. 4,538,454 issued on Sep. 3, 1985 and U.S. Pat. No. 4,556,030 issued on December 1985 all in the name of Aono. The content of these documents is hereby incorporated by reference thereto.

TABLE 5

| COG POSITION | COMBUSTION |
|---|---|
| TDC-ATCD10° | Misfire |
| ATDC10°-ATDC15° | Advanced Ignition Timing |
| ATDC15°-ATDC25° | Correct Ignition Timing |
| ATDC25°- | Delayed Ignition Timing |

It will be noted that the sampling range in the third embodiment is a little different than in the case of the first and second embodiments. Viz., in the third embodiment, the sampling is taken from TDC as different from −40° and −30° in the first and second embodiments, respectively. The reasons for this reduced sampling range and data are that in the case of a six cylinder four cycle engine for example, wherein all cylinders complete one cycle every 720° there is only a 120° interval in which to gather and process the necessary data. By reducing the amount of data samples to the minimum the size and cost of the hardware involved can be kept at acceptable levels. Further, the reduced amount of data facilitates the execution of corrective control measures in the finite time left in the 120° window after execution of the instant embodiment.

Moreover, in order to implement the present invention it is necessary to be able to detect the maximum pressure which develops in the combustion chamber. As this pressure does not occur before TDC, sampling beforehand does not notably improve the accuracy of the third embodiment and therefore is not warranted.

Figure 17:
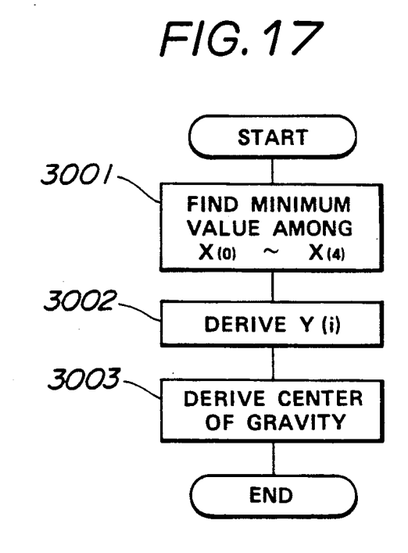
FIG. 17 is a flow chart showing the steps which are excuted in a routine arranged to execute the third embodiment.

FIG. 17 shows in flow chart form the characterizing steps of a routine which is designed to implement the third embodiment. The first step 3001 of this routine is such as to sample and five pressure readings x(0)–x(4) and to select the minimum of the same. In step 3002 the values of the five readings are reduced by the value of the minimum one. Viz., the corrected y(i) values which correspond to the five data readings are developed. In step 3003 the position of the center of gravity is calculated using the values generated in the previous step.

What is claimed is:

1. A method for detecting a misfire in a combustion chamber of an internal combustion engine, comprising the steps of:
    sampling pressure in said combustion chamber at predetermined crank angles $\phi_n$ to derive data $x_n$ indicating sampled combustion chamber pressures;
    using said data $x_n$ derived in said sampling step to determine a resultant value of a crank angle G at which a cumulative effect of said sampled combustion chamber pressures can be considered to have acted using the following equation, $$G = \frac{x_1\phi_1 + x_2\phi_2 \ldots + x_n\phi_n}{x_1 + x_2 \ldots + x_n};$$

comparing said resultant value of said crank angle G with a predetermined value; and
    determining the presence of said misfire in the event that said resultant value is smaller than said predetermined value.

2. A method as claimed in claim 1 wherein said sampling step includes the step of:
    sampling said pressure in said combustion chamber over a predetermined crank angle range.

3. A method as claimed in claim 2 wherein:
said predetermined range is selected so that the center of said range coincides with a top dead center (TDC) crank angle.

4. A method as claimed in claim 3 further comprising the steps of:
determining the lowest value of said sampled pressures;
reducing all values of said sampled pressures by said lowest value of said sampled pressures to produce reduced values;
using said reduced values to calculate said resultant value of said crank angle at which said cumulative effect of said sampled pressures can be considered to have acted.

5. A method as claimed in claim 2 wherein:
said predetermined range is selected so that the beginning of said range coincides with a top dead center (TDC) crank angle.

6. A method as claimed in claim 5 further comprising the steps of:
determining a highest value of said sampled pressures; and
utilizing only values of said sampled pressures which are located in a crank angle range the center of which is defined by the crank angle of said highest value of said sampled pressures to determine said crank angle at which said cumulative effect of said sampled pressures can be deemed to have acted.

7. In an engine misfire detection system for an internal combustion engine having a combustion chamber, the combination comprising:
means for sampling pressure in said combustion chamber at predetermined crank angles $\phi_n$ to derive data $x_n$ indicating sampled pressures; and
computation means for
using said data $x_n$ to obtain a determined crank angle G at which a cumulative effect of said sampled pressures can be considered to have acted using the following equation $$G = \frac{x_1\phi_1 + x_2\phi_2 \ldots + x_n\phi_n}{x_1 + x_2 \ldots + x_n},$$

comparing said determined crank angle G with a predetermined crank angle, and
determining the presence of a misfire in said combustion chamber when said determined crank angle is less than said predetermined crank angle.

8. A control system as claimed in claim 7 wherein said means for sampling samples said pressure in said combustion chamber over a predetermined crank angle range.

9. A control system as claimed in claim 8 wherein said predetermine range is selected so that the center of said range coincides with a top dead center (TDC) crank angle.

10. A control system as claimed in claim 9 wherein said computation means includes:
circuitry for determining the highest pressure of said sampled pressures and for utilizing only ones of said sampled pressures which are located in said crank angle range, a center of which is defined by said highest pressure to determine a crank angle at which said cumulative effect of said sampled pressures can be considered to have acted.

11. A control system as claimed in claim 8 wherein said predetermined range is selected so that the beginning of said range coincides with a top dead center (TDC) crank angle.

12. A control system as claimed in claim 8 wherein said computation means includes:
circuitry for determining the lowest pressure of said sampled pressures, reducing all of said sampled pressures by said lowest sampled pressure to obtain reduced sampled pressures and using said reduced sampled pressures to calculate said crank angle at which said cumulative effect of said sampled pressures can be considered to have acted.

* * * * *